United States Patent [19]
Amano

[11] Patent Number: 5,264,518
[45] Date of Patent: Nov. 23, 1993

[54] POLYCARBODIIMIDE PULP AND PROCESS FOR PRODUCING THEREOF

[75] Inventor: Satoshi Amano, Tokyo, Japan

[73] Assignee: Nisshinbo Industries, Inc., Tokyo, Japan

[21] Appl. No.: 907,406

[22] Filed: Jul. 1, 1992

[30] Foreign Application Priority Data

Jul. 3, 1991 [JP] Japan .................. 3-190615

[51] Int. Cl.$^5$ .................. C08G 18/02; C08G 18/76; C08G 18/80
[52] U.S. Cl. .................. 528/44; 528/45; 528/48; 528/51; 524/589; 524/755; 524/839
[58] Field of Search .................. 528/44, 45, 48, 51; 524/589, 755, 839

[56] References Cited

U.S. PATENT DOCUMENTS

| | | | |
|---|---|---|---|
| 2,853,473 | 9/1958 | Campbell et al. | 521/159 |
| 2,941,966 | 6/1960 | Campbell | 521/159 |
| 3,929,733 | 12/1975 | Alberino et al. | 528/51 |
| 3,960,950 | 6/1976 | Hansen | 528/51 |
| 5,100,994 | 3/1992 | Amano et al. | 528/44 |

*Primary Examiner*—Morton Foelak
*Assistant Examiner*—Rabon Sergent
*Attorney, Agent, or Firm*—Shea & Gould

[57] ABSTRACT

The present invention is intended to provide a polycarbodiimide pulp improved in heat resistance, etc. and a process allowing for easy production of said polycarbodiimide pulp.

The polycarbodiimide pulp of the present invention consists substantially of a polycarbodiimide represented by one of the following formula

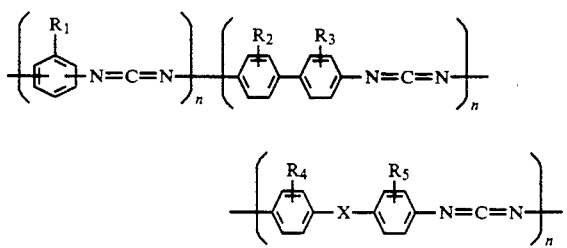

wherein $R_1$, $R_2$ and $R_3$ each represent a lower alkyl group or a lower alkoxy group, $R_4$ and $R_5$ each represent a hydrogen atom, a lower alkyl group or a lower alkoxy group, and X represents an oxygen atom or a methylene group.

15 Claims, 3 Drawing Sheets

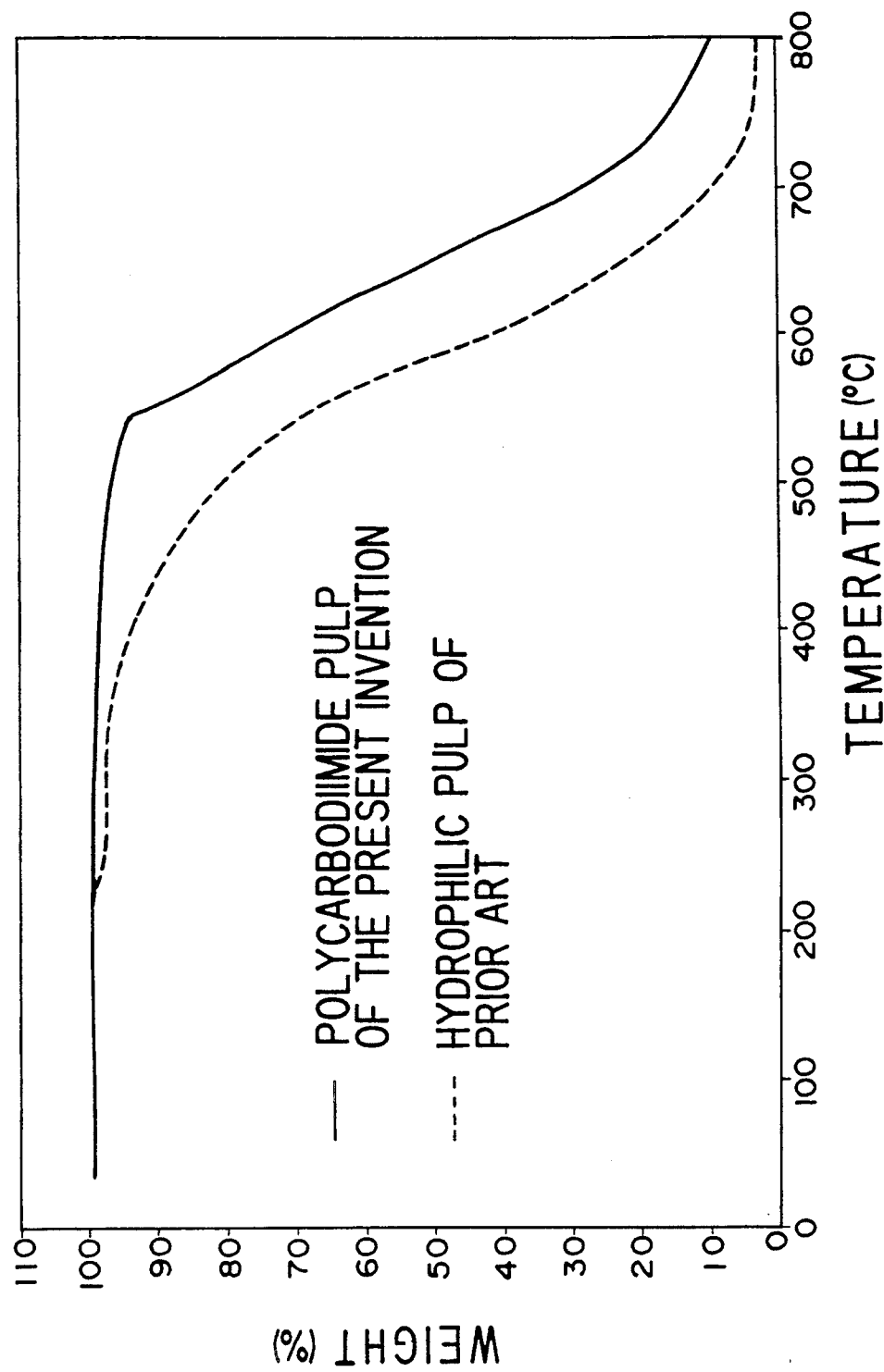

POLYCARBODIIMIDE PULP AND PROCESS FOR PRODUCING THEREOF

BACKGROUND OF THE INVENTION

(1) Field of the Invention

The present invention relates to a pulp produced from a polycarbodiimide, as well as to a process for production thereof. More particularly, the present invention relates to a polycarbodiimide pulp improved particularly in heat resistance, as well as to a process for production thereof.

(2) Prior Art

Polycarbodiimides have heat resistance, electrical insulating property, mechanical properties, reactivity, etc. and are therefore used in molding materials, hydrolysis-resistant agents, etc. Hence, it is anticipated that if a polycarbodiimide having such excellent properties could be made into a pulp, the pulp would find useful applications in various fields. In producing a pulp from a polycarbodiimide, it is considered to use a known process conventionally employed in production of an unwoven fabric or a pulp-like material made of a general-purpose thermoplastic resin, i.e., a splitting process, a polymer-blending process, a melt blowing process or the like. However, since polycarbodiimides are each a thermosetting resin and give rise to curing in the course of pulping, it is impossible to produce a polycarbodiimide pulp by any of the above processes.

Much effort was made in order to make an aromatic polyamide or the like into a pulp-like material, and many techniques were proposed. There can be mentioned, for example, techniques disclosed in Japanese Patent Publication No. 5732/1960, Japanese Patent Publication No. 13912/1963 and Japanese Patent Application Kokai (Laid-Open) No. 23602/1972. The techniques disclosed in these documents comprise discharging a dope of an aromatic polyamide in an organic solvent, into a coagulating bath (a liquid incapable of dissolving the aromatic polyamide) through a nozzle and vigorously stirring the bath to obtain a pulp-like material in the bath. Hence, it is considered to produce a polycarbodiimide pulp according to these techniques.

In the above techniques, the coagulating bath must be stirred uniformly and vigorously while a pulp-like material is produced continuously. Therefore, it is almost impossible from a practical standpoint to conduct vigorous stirring in a state that the shape and amount of solidified product change every moment, and uniformly apply a shear force to a dope introduced continuously, and therefore it is very difficult to obtain a pulp-like material of desired shape and quality.

Further, the polycarbodiimide dopes produced by conventional processes have insufficient stability and, in their pulping, give rise to gelling or becomes lumps owing to their severe agglomeration. Therefore, it is very difficult to obtain a pulp-like material from any of said dopes.

The conventional processes for producing a polycarbodiimide are disclosed in, for example, Japanese Patent Application Kokai (Laid-Open) No. 61599/1976; D. J. Lyman et al., "Die Makromol. Chem., 67, 1 (1963)"; and E. Dyer et al., "J. Am. Chem. Soc., 80, 5495 (1985)". In these processes, as the polymerization solvent, there are used hydrocarbons (e.g. benzene), o-dichlorobenzene, etc.; and as the organic diisocyanate, there are used 4,4'-diphenylmethane diisocyanate, tolylene diisocyanate and various other diisocyanates in a concentration of 10-25% by weight. In these known processes, the reaction system gives rise to gelling or precipitation in more than 10 minutes from the start of the reaction, making it impossible to obtain a reaction mixture in the form of a solution. Thus, the above conventional processes are unable to give a polycarbodiimide solution having excellent stability.

As a method for obtaining a polycarbodiimide solution having improved stability, there is a method of lowering the molecular weight of polycarbodiimide. This approach, however, is unable to give a pulp-like material and gives a powder of low heat resistance.

Meanwhile, the present inventor previously developed a polycarbodiimide pulp which is obtained by converting an organic diisocyanate into its quaternary ammonium salt and then converting the salt into a polycarbodiimide [Japanese Patent Application Kokai (Laid-Open) No. 62814/1991]. In view of the application purpose of polycarbodiimide, etc. it is desired to develop a polycarbodiimide pulp having improved heat resistance, etc.

SUMMARY OF THE INVENTION

The present invention has been made under the above-mentioned situation of prior art, and has an object of providing a polycarbodiimide pulp having improved heat resistance, etc.

The present invention has another object of providing a process allowing for easy production of the above polycarbodiimide pulp.

The polycarbodiimide pulp provided by the present invention in order to achieve the above object, consists substantially of a polycarbodiimide represented by the following formula

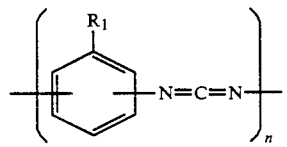

wherein $R_1$ represents a lower alkyl group or a lower alkoxy group, or the following formula

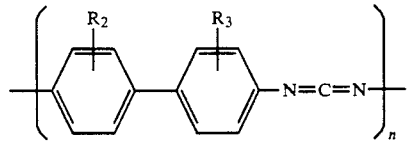

wherein $R_2$ and $R_3$ each represent a lower alkyl group or a lower alkoxy group, or the following formula

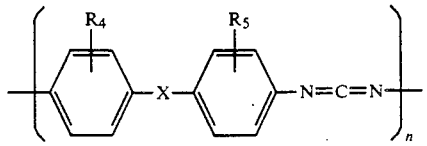

wherein $R_4$ and $R_5$ each represent a hydrogen atom, a lower alkyl group or a lower alkoxy group and X represents an oxygen atom or a methylene group.

And the process for producing a polycarbodiimide pulp, provided by the present invention in order to achieve the above object, comprises polymerizing an organic diisocyanate in the presence of a carbodiimidization catalyst in an alicyclic ether as a polymerization solvent to obtain a dope containing a polycarbodiimide and then discharging the dope and a coagulating solution containing, as the main component, a poor solvent to polycarbodiimide, through nozzle(s) to allow the dope and the coagulating solution to contact with each other to pulp the polycarbodiimide, or comprises polymerizing an organic diisocyanate in the presence of a carbodiimidazation catalyst in an alicyclic ether as a polymerization solvent to obtain a dope containing a polycarbodiimide and then discharging the dope and a coagulating solution containing, as the main component, a poor solvent to polycarbodiimide, through nozzle(s) into or onto a coagulating bath containing, as the main component, a poor solvent to the polycarbodiimide while allowing the dope and the coagulating solution to contact with each other, to pulp the polycarbodiimide.

In the present invention, a stable polycarbodiimide dope can be prepared by using an alicyclic ether as a solvent for carbodiimide polymerization. Further, the dope is improved in dispersibility in coagulating solution or coagulating bath, as well as in solvent removability. Accordingly, by using nozzle(s) and allowing the dope and the coagulating solution to contact with each other or discharging them into or onto the coagulating bath while allowing them to contact with each other, there can be very easily obtained a polycarbodiimide pulp of good shape and quality.

BRIEF DESCRIPTION OF THE DRAWINGS

FIG. 3 is a chart showing the results of differential thermal analysis of the pulp obtained in Example 4 and a known hydrophilic pulp.

DETAILED DESCRIPTION OF THE INVENTION

Figure 1:
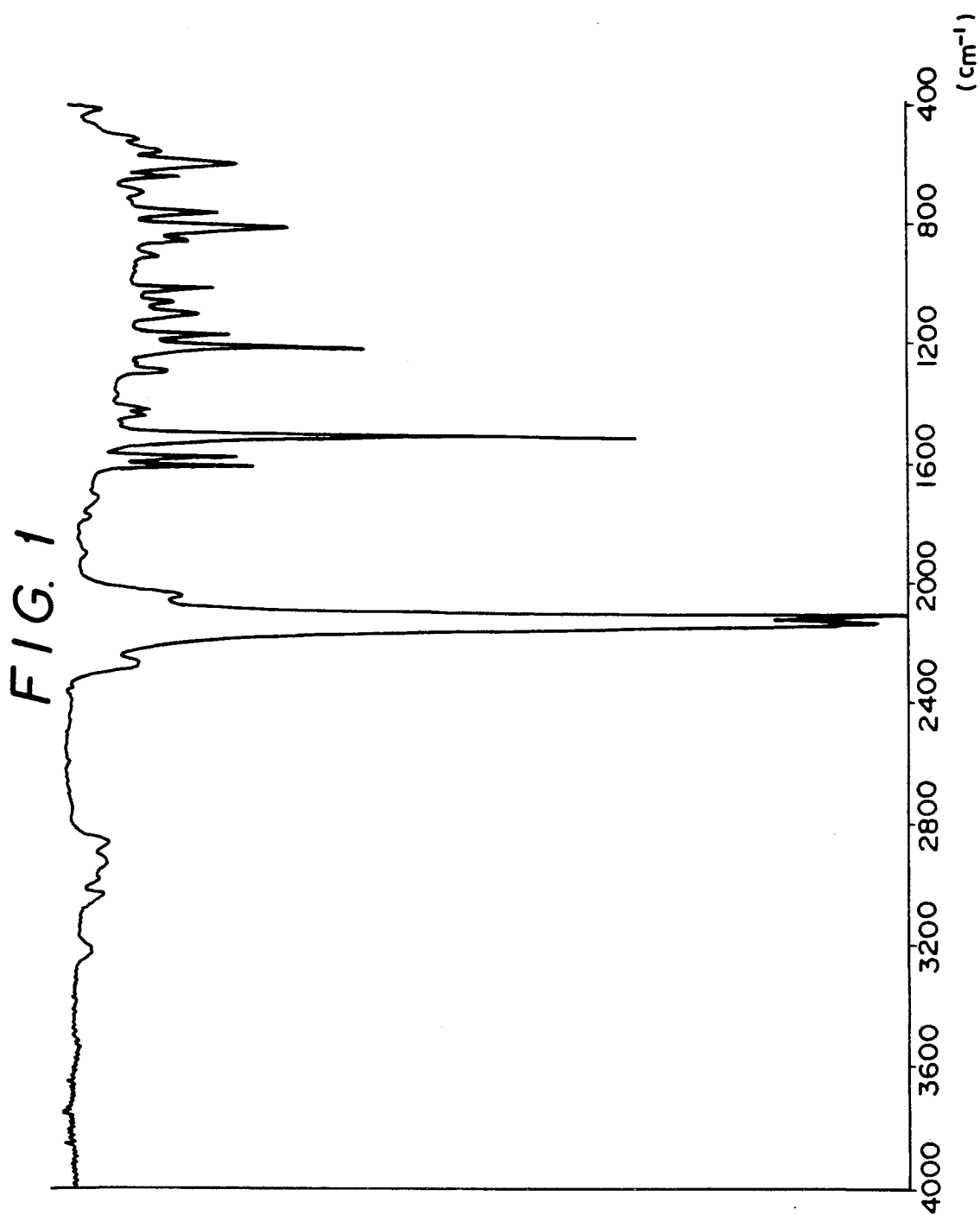
FIG. 1 is an infrared absorption spectrum of the pulp obtained in Example 4.

The present invention is hereinafter described in detail.

In order to obtain the polycarbodiimide dope used in the present invention, an organic diisocyanate is subjected to a polymerization reaction in the presence of a carbodiimidization catalyst using an alicyclic ether as a polymerization solvent. The organic diisocyanate as a raw material includes, for example, a compound represented by the following formula

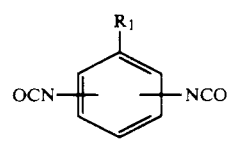
(1)

wherein $R_1$ represents a lower alkyl group or a lower alkoxy group, a compound represented by the following formula

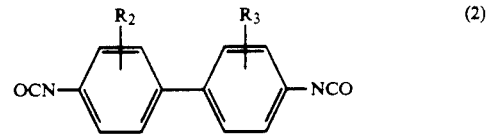
(2)

wherein $R_2$ and $R_3$ each represent a lower alkyl group or a lower alkoxy group, and a compound represented by the following formula

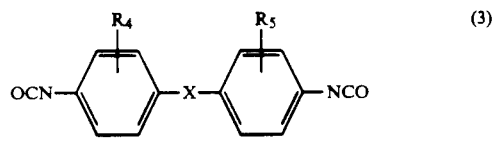
(3)

wherein $R_4$ and $R_5$ each represent a hydrogen atom, a lower alkyl group or a lower alkoxy group and X represents an oxygen atom or a methylene group.

In the above formulas, $R_1$, $R_2$ and $R_3$ each represent a lower alkyl group such as methyl, ethyl, propyl, butyl or the like, or a corresponding lower alkoxy group; $R_4$ and $R_5$ each represent a hydrogen atom, the same lower alkyl group as above, or the same lower alkoxy group as above; and X represents an oxygen atom or a methylene group ($-CH_2-$). Hence, specific examples of the organic diisocyanate represented by the formula (1) include tolylene diisocyanates (e.g. 2,4-tolylene diisocyanate, 2,6-tolylene diisocyanate, mixture of 2,4-tolylene diisocyanate and 2,6-tolylene diisocyanate) and 1-methoxyphenyl-2,4-diisocyanate; specific examples of the organic diisocyanate represented by the formula (2) include o-tolidine diisocyanate; and specific examples of the organic diisocyanate represented by the formula (3) include 4,4-diphenylmethane diisocyanate, 4,4-diphenylether diisocyanate, and 3,3-dimethyl-4,4'-diphenyl ether diisocyanate. These diisocyanates can be used alone or as a mixture of two or more.

In the present invention, the organic diisocyanate is reacted in an alicyclic ether. Preferably, the alicyclic ether is a liquid at room temperature and has two or less ether bonds in the molecule. Specific examples of the alicyclic ether are tetrahydrofuran, dioxane, tetrahydropyran and mixtures thereof. Of these, tetrahydrofuran is preferable.

When there is used the organic diisocyanate such as mentioned above, the reaction is conducted at a monomer concentration of 30% by weight or less, preferably 20% by weight or less. When the monomer concentration is more than 30% by weight, the resulting polycarbodiimide gives a powder or a hard pulp consisting of thick fibers, which is not preferable; further, the powder or the pulp contains many isocyanate groups and gives rise to foaming during processing such as molding or the like, which is not preferable, either; furthermore, the powder or the pulp gives rise to foaming at temperatures of 200° C. or above, whereby the excellent heat resistance of polycarbodiimide pulp is impaired. In order to avoid this foaming problem, it is effective to control the NCO content in the dope at 3% or less, preferably 2% or less.

As an alternative method for preventing foaming, there can be employed terminal blocking or the lowering of molding temperature. As the terminal-blocking agent, there can be mentioned, for example, a monoisocyanate, thiophenol, phenol, aniline, benzoic acid and their derivatives obtained by introducing a substituent thereinto. The substituent includes a lower alkyl group, a lower alkoxy group, a lower unsaturated alkyl group, etc. The above-mentioned terminal-blocking agents are aromatic compounds but, as a matter of course, aliphatic compounds can be used depending upon the degree of heat resistance required for polycarbodiimide pulp.

Further, the terminal blocking agent may be derived from an isocyanate-terminated compound which can be easily produced by a reaction between about 1 mole of a compound having —OH, —NH$_2$, —COOH, —SH, or —NH-alkyl terminal and 2 moles of an aromatic diisocyanate.

The molecular weight of the polycarbodiimide must be at least 2,000, preferably at least 3,000. When the molecular weight is smaller than 2,000, it is impossible to obtain a pulp shape and there is obtained a powder.

The dope may contain a surfactant or the like so as to have improved dispersibility in pulping. The dope may further contain a solid inorganic substance depending upon the application of the resulting polycarbodiimide pulp. As the solid inorganic substance, there can be mentioned mica, glass flakes, a silica powder, an alumina powder, kaolin, talc, wollastonite, barium sulfate, magnesium sulfate, a graphite powder, etc.

The reaction of an organic diisocyanate in an alicyclic ether is conducted in the presence of a carbodiimidization catalyst. As the carbodiimidization catalyst, there can be mentioned, for example, phosphorene oxides such as 3-methyl-1-phenylphosphorene oxide and the like.

In the present invention, the thus produced dope and a coagulating solution are discharged through nozzle(s) and thereby contacted with each other. Since the dope has excellent dispersibility in the coagulating solution and high solvent removability, the polycarbodiimide in the dope becomes a pulp right after the contact of the dope with the coagulating solution.

The coagulating solution is a liquid containing, as the main component, a poor solvent to polycarbodiimide. Examples of the poor solvent are water, methanol, ethanol, isopropyl alcohol, acetone, methylene chloride, etc. The poor solvent may also be an appropriate mixture thereof, or its mixture with a small amount of the same alicyclic ether as contained in the dope. The poor solvent to polycarbodiimide is preferably water in view of the economy.

Optionally, the coagulating solution may contain a small amount of an auxiliary agent such as surfactant or the like so that the dispersibility of the dope in the coagulating solution can be improved. As necessary, the coagulating solution may be heated for pulp production at a higher rate. The temperature of the coagulating solution is preferably room temperature to 100° C.

Pulping can be conducted not only by discharging the dope and the coagulating solution through nozzle(s) to allow them to contact with each other but also by discharging them through nozzle(s) into or onto a coagulating bath while allowing them to contact with each other. The liquid used in the coagulating bath, similarly to the liquid used as the coagulating solution, is composed mainly of a poor solvent to polycarbodiimide.

The composition of the coagulating bath need not be the same as that of the coagulating solution but is preferably the same.

The nozzle(s) used for discharging the dope and the coagulating solution has (have) no particular restriction and can be any as long as it (they) can discharge the dope and the coagulating solution vigorously. There can be used two nozzles (one for the dope and the other for the coagulating solution) or a so-called double-fluid nozzle for both the dope and the coagulating solution. When the double-fluid nozzle is used, the dope is subjected, in the nozzle, to shear and beating given by the coagulating solution continuously fed into the nozzle; as a result, an excellent pulp is produced. Alternatively, the dope and the coagulating solution can be discharged from respective nozzles to allow them to contact with each other; as a result, the dope undergoes shear and beating and a pulp can be produced. The discharging speeds of the two fluids discharged vary with the type(s) of the nozzle(s) used, and are set so that the polycarbodiimide precipitated in the coagulating solution can have a uniform and good shape. The dope and/or the coagulating solution maybe heated to an appropriate temperature.

The thus produced polycarbodiimide pulp of the present invention is represented by one of the above formulas and was found to have a high thermal decomposition temperature of 450° C. or above. Incidentally, no explanation is made on the substituent in each formula because it is the same substituent as in the organic diisocyanate used as a raw material.

The polycarbodiimide pulp obtained by the present process has not only the heat resistance characteristic of polycarbodiimides but also thermosetting property. As a result, the pulp can be made into a sheet-like material by itself or can be mixed with short fibers to obtain a paper-like material with strength usable in various fields. Thus, the polycarbodiimide pulp has various applications.

The present invention is hereinafter described in detail by way of Examples.

Production Examples of dopes

Production Examples 1-9 and Reference Examples 1-2

To a four-necked flask of given capacity were connected a Dimroth condenser, a thermometer and a mechanical stirrer. From the raw material inlet of the flask was added a solvent of measured volume. Then, an isocyanate as a raw material was added. Further, there was added 0.2% by weight, based on the isocyanate, of 3-methyl-1-phenylphosphoreneoxide. Thereafter, a reaction was conducted for a given length of time under the refluxing of the solvent, to obtain a polycarbodiimide dope. The dope was measured for storage stability by allowing the dope to stand at 5° C. in a refrigerator until the dope showed gelling. The storage stability was expressed as pot life (days from the day of test start to the day of gelling). The dope was also measured for NCO content (%) by an n-butylamine method. The production conditions and dope properties are shown in Table 1.

TABLE 1

|  | Isocyanate [figure in ( ) = g] | Solvent [figure in ( ) = ml] | Monomer concentration (%) | Reaction time (hr) | Pot life (days) | NCO (%) |
| --- | --- | --- | --- | --- | --- | --- |
| Production Example 1 | 80-TDI (600) | THF (4000) | 14.4 | 12 | 10 | 1.2 |

TABLE 1-continued

| | Isocyanate [figure in ( ) = g] | Solvent [figure in ( ) = ml] | Monomer concentration (%) | Reaction time (hr) | Pot life (days) | NCO (%) |
| --- | --- | --- | --- | --- | --- | --- |
| Production Example 2 | MDI (650) | THF (4000) | 15.5 | 7 | 7 | 1.0 |
| Production Example 3 | TODI (49) | THF (500) | 10.0 | 70 | 3 | 2.0 |
| Production Example 4 | MDI/80-TDI (80/20) | THF (500) | 18.4 | 8 | 7 | 2.3 |
| Production Example 5 | MDI/EDI (60/10) | THF (500) | 13.6 | 6 | 4 | 2.4 |
| Production Example 6 | MDI (550) | 1,4-Dioxane (4000) | 11.8 | 4 | 3 | 1.0 |
| Production Example 7 | MDI (600) | THF/THP (3000/1000) | 14.5 | 6 | 5 | 1.1 |
| Production Example 8 | MDI (125) | THF (500) | 22.0 | 4 | 3 | 2.2 |
| Production Example 9 | MDI (237) | THF (500) | 5.0 | 17 | 30 | 0 |
| Reference Example 1 | MDI (296) | THF (500) | 40.0 | 4 | 0.4 | 2.8 |
| Reference Example 2 | MDI (650) | THF (4000) | 15.5 | 3 | 7 | 3.5 |

Notes
MDI: 4,4-diphenylmethane diisocyanate
EDI: 4,4-diphenylether diisocyanate
80-TDI: 2,4-tolylene diisocyanate/2,6-tolylene diisocyanate mixture (8:2)
TODI: o-tolidine diisocyanate
THF: tetrahydrofuran
THP: tetrahydropyran Production Examples of terminal-blocked polycarbodiimide dopes Production Example 10

The same apparatus as above was assembled. From the raw material inlet of the flask were added 3,000 ml of THF, 1,600 g of MDI, 28.6 g of phenyl isocyanate and a carbodiimidization catalyst. Then, a reaction was conducted for 10 hours under the refluxing of the solvent. The termination of the reaction was determined by confirming the disappearance of isocyanate group in infrared absorption spectrum. The obtained dope showed a storage stability in refrigerator, of 3 weeks.

Production Example 11

The same apparatus as in Production Example 10 was assembled. There were added 3,000 ml of THF, 1,500 g of 80-TDI, 22.8 g of phenyl isocyanate and a carbodiimidization catalyst. Then, a reaction was conducted for 70 hours under the refluxing of the solvent. The reaction mixture showed the disappearance of isocyanate in infrared absorption spectrum. The obtained dope showed a storage stability in refrigerator, of 4 weeks.

Production Example 12

Into the same apparatus as in Production Example 10 was placed 3,000 ml of THF. 600 g of MDI was added. To the resulting solution was slowly added, at room temperature, a solution of 8.9 g of aniline dissolved in 500 ml of THF. A reaction was conducted for 5 hours. The disappearance of amine and the formation of ureido were confirmed by examining the infrared absorption spectrum of the reaction mixture. Thereafter, a carbodiimidization catalyst was added and a reaction was conducted for 10 hours under the refluxing of the solvent. The disappearance of isocyanate was confirmed by examining the infrared absorption spectrum of the reaction mixture. The obtained dope showed a storage stability in refrigerator, of 2 weeks.

Production Example 13

The same apparatus as in Production Example 10 was assembled. 3,000 ml of THF was placed in the apparatus. 600 g of 80-TDI was added. Thereto was added a solution of 10 g of benzoic acid dissolved in 500 ml of THF. A reaction was conducted for 5 hours at 60° C. The disappearance of carboxylic acid was confirmed by examining the infrared absorption spectrum of the reaction mixture. Then, a carbodiimidization catalyst was added and a reaction was conducted for 10 hours under the refluxing of the solvent. The disappearance of isocyanate was confirmed by examining the infrared absorption spectrum of the reaction mixture. The obtained dope showed a storage stability in refrigerator, of 2 weeks.

EXAMPLE 1

The dope produced in Production Example 1 was placed in an autoclave. The autoclave was connected to a nozzle and also to a compressor. The dope was discharged by means of a back pressure. The nozzle was a double-fluid nozzle manufactured by Spraying System Co. The back pressure was adjusted so as to give a dope discharge amount of 10 ml/min and a coagulant discharge amount of 1,000 ml/min, and the two fluids were discharged onto a coagulating bath for pulping. The bath was filtered and the filtrate was dried to obtain a pulp.

The pulp was measured for freeness according to JIS P8121 (Canadian standard). The pulp was also observed for shape.

EXAMPLE 2

There were used the dope produced in Production Example 2 and the same apparatus as used in Example 1. The back pressure was adjusted so as to give a dope discharge amount of 10 ml/min and a coagulant discharge amount of 1,010 ml/min, and the two fluids were discharged from a double-fluid nozzle onto a coagulating bath for pulping. The pulp obtained was measured for properties by the same methods as in Example 1.

EXAMPLE 3

There were used the dope produced in Production Example 2 and the same apparatus as used in Example 1. There was used a single-fluid nozzle for each of the dope and the coagulating solution. Their discharge amounts were 10 ml/min and 1,100 ml/min, respectively. The two fluids discharged from the two nozzles were collided with each other and dropped onto a coagulating bath to which a shear force was applied, whereby pulping was conducted. Then, filtration and drying were conducted to obtain a pulp. The pulp was measured for properties by the same methods as in Example 1.

EXAMPLE 4

There were used the dope produced in Production Example 2 and the same apparatus as used in Example 1. A double-fluid nozzle was used. The back pressure was adjusted so as to give a dope discharge amount of 10 ml/min and a coagulant discharge amount of 1,500 ml/min, and the dope and the coagulant were discharged directly onto a filter for pulping. Drying followed to obtain a pulp. The pulp was measured for properties by the same methods as in Example 1.

Figure 2:
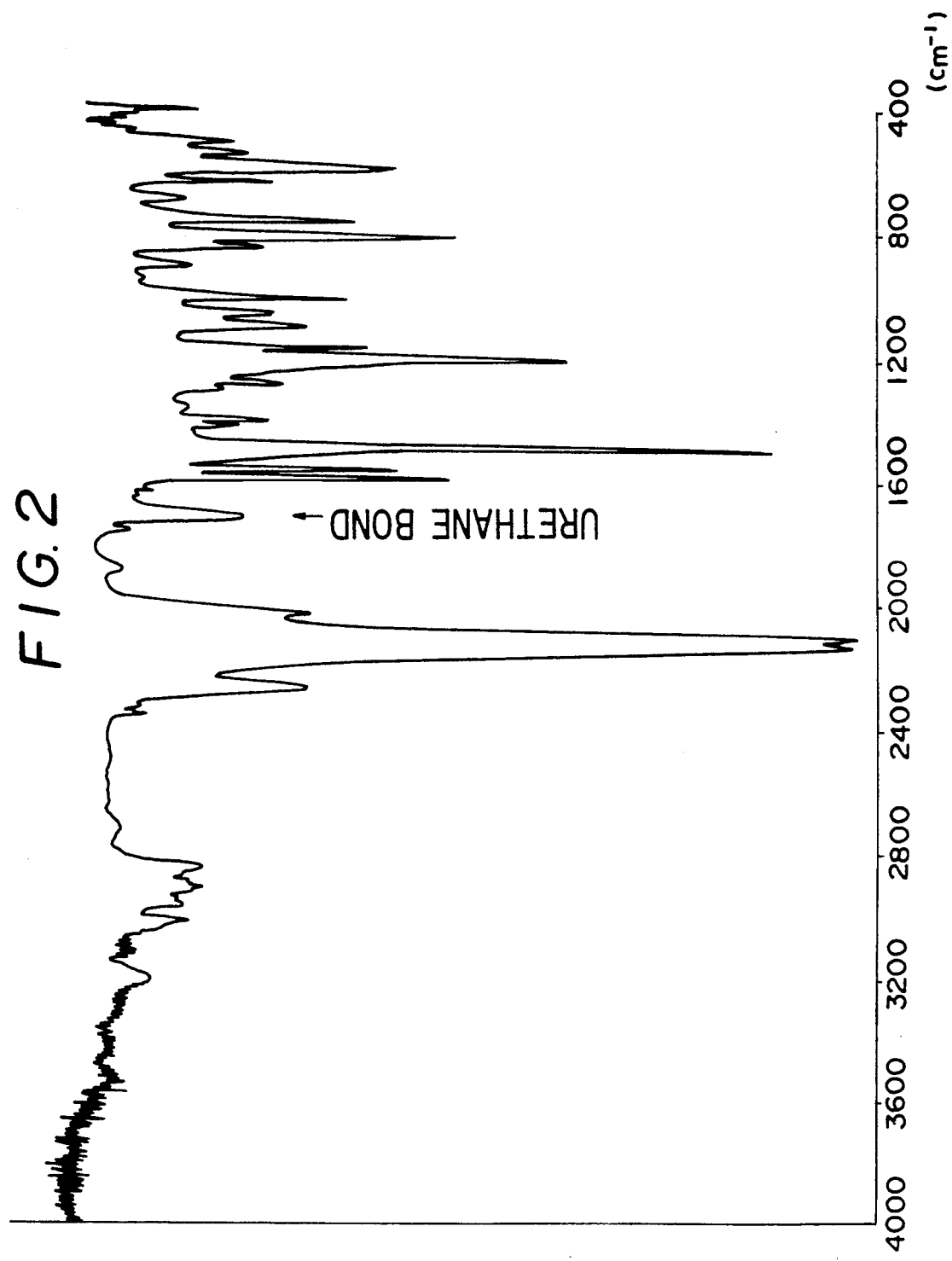
FIG. 2 is an infrared absorption spectrum of a known hydrophilic pulp.

The pulp obtained in this Example and a known hydrophilic pulp were subjected to infrared absorption spectrum measurement and differential thermal analysis. The infrared absorption spectra are shown in FIG. 1 and FIG. 2; and the differential thermal analysis results are shown in FIG. 3. As is clear from FIGS. 1, 2 and 3, the spectrum of the known pulp gives an absorption at 1,728 cm$^{-1}$ which is assigned to urethane bond and, in the differential thermal analysis, the temperature of start of thermal decomposition was 550° C. in the present pulp and 400° C. in the known pulp

EXAMPLE 5

There were used the dope produced in Production Example 1 and the same apparatus as used in Example 1. A double-fluid nozzle was used. The back pressure was adjusted so as to give a dope discharge amount of 60 ml/min and a coagulant discharge amount of 800 ml/min, and the dope and the coagulant were discharged into a coagulating bath for pulping. Filtration and drying followed to obtain a pulp. The pulp was measured for properties by the same methods as in Example 1.

EXAMPLES 6-25 AND COMPARATIVE EXAMPLES 1-2

The procedures for Examples 6-25 and Comparative Examples 1-2 were similar to those for Examples 1-5.

The production conditions and pulp properties for Examples 1-25 and Comparative Examples 1-2 are shown in Table 2 and Table 3.

TABLE 2

| | Nozzle type | Dope used | Amount of dope discharged (ml/min) | Amount of coagulating solution discharged (ml/min) | Dischaging onto/into bath | Fibrillation | Freeness |
|---|---|---|---|---|---|---|---|
| Examples | | | | | | | |
| 1 | Double-fluid | P-Example 1 | 10 | 1000 | onto | good | 756 |
| 2 | Double-fluid | P-Example 2 | 10 | 1010 | onto | good | 740 |
| 3 | Single-fluid | P-Example 2 | 10 | 1100 | onto | good | 750 |
| 4 | Double-fluid | P-Example 2 | 10 | 1500 | dischaging onto filter | good | 745 |
| 5 | Double-fluid | P-Example 1 | 60 | 800 | into | good | 770 |
| 6 | Double-fluid | P-Example 3 | 5 | 1000 | onto | slightly good | 800 |
| 7 | Double-fluid | P-Example 4 | 15 | 1000 | onto | good | 760 |
| 8 | Double-fluid | P-Example 5 | 5 | 1000 | into | slightly good | 820 |
| 9 | Single-fluid | P-Example 6 | 50 | 4000 | onto | good | 745 |
| 10 | Double-fluid | P-Example 7 | 10 | 1200 | onto | good | 760 |
| 11 | Single-fluid | P-Example 8 | 50 | 7000 | onto | good | 765 |
| 12 | Double-fluid | P-Example 9 | 3 | 3000 | onto | good | 750 |
| 13 | Double-fluid | P-Example 10 | 50 | 7000 | onto | good | 745 |
| 14 | Single-fluid | P-Example 11 | 100 | 7000 | into | good | 765 |
| 15 | Double-fluid | P-Example 12 | 10 | 1500 | onto | good | 767 |
| 16 | Double-fluid | P-Example 13 | 10 | 1500 | onto | good | 780 |
| Comparative Examples | | | | | | | |
| 1 | Double-fluid | R-Example 1 | 10 | 1000 | into | Lump-like | — |
| 2 | Double-fluid | R-Example 2 | 10 | 1000 | onto | Powdery | — |

Notes
Coagulating solution: water (water containing 5% of THF was used in Example 12)
Coagulating bath: water (water containing 5% of THF was used in Example 12)
P-Example : Production Example
R-Example : Reference Example

TABLE 3

| Examples | Nozzle type | Dope used | Amount of dope discharged (ml/min) | Amount of coagulating solution discharged (ml/min) | Coagulating bath | Fibrillation | Freeness |
|---|---|---|---|---|---|---|---|
| 17 | Double-fluid | P-Example 1 | 10 | 1200 | — | good | 746 |
| 18 | Single-fluid | P-Example 2 | 10 | 1500 | — | slightly good | 700 |
| 19 | Double-fluid | P-Example 3 | 5 | 1200 | — | slightly good | 790 |
| 20 | Double-fluid | P-Example 4 | 15 | 1500 | — | good | 750 |
| 21 | Single-fluid | P-Example 4 | 15 | 1500 | — | good | 746 |
| 22 | Double-fluid | P-Example 5 | 5 | 1500 | — | slightly good | 710 |
| 23 | Double-fluid | P-Example 6 | 10 | 1200 | — | good | 740 |
| 24 | Double-fluid | P-Example 7 | 10 | 1500 | — | good | 755 |

What is claimed is:

1. A polycarbodiimide pulp consisting essentially of a polycarbodiimide represented by the following repeating units

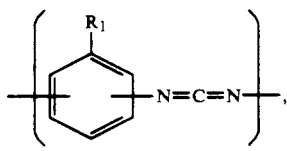

wherein $R_1$ represents a lower alkyl group or a lower alkoxy group, said polycarbodiimide having a molecular weight of at least 2000 and being in pulp-like form.

2. A polycarbodiimide pulp consisting essentially of a polycarbodiimide represented by the following repeating units

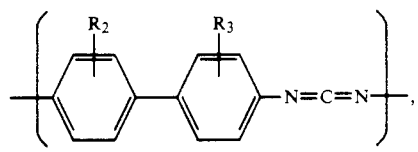

wherein $R_2$ and $R_3$ each represent a lower alkyl group or a lower alkoxy group said polycarbodiimide having a molecular weight of at least 2000 and being in pulp-like form.

3. A polycarbodiimide pulp consisting essentially of a polycarbodiimide represented by the following repeating units

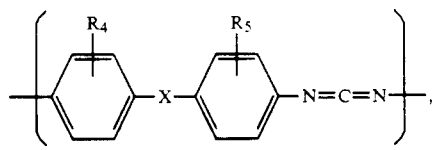

wherein $R_4$ and $R_5$ each represent a hydrogen atom, a lower alkyl group or a lower alkoxy group, and X represents an oxygen atom or a methylene group, said polycarbodiimide having a molecular weight of at least 2000 and being in pulp-like form.

4. A polycarbodiimide pulp according to any one of claims 1 to 3, which has a thermal decomposition temperature of 450° C. or above.

5. A process for producing a polycarbodiimide pulp, consisting essentially of polymerizing an organic diisocyanate in the presence of a carbodiimidization catalyst in an alicyclic ether as a polymerization solvent to obtain a dope containing a polycarbodiimide having an NCO content of 3% or less and then discharging the dope and a coagulating solution containing, as the main component, a poor solvent for the polycarbodiimide, through nozzle(s) to allow the dope and the coagulating solution to contact with each other to pulp the polycarbodiimide.

6. A process for producing a polycarbodiimide pulp, consisting essentially of polymerizing an organic diisocyanate in the presence of a carbodiimidization catalyst in an alicyclic ether as a polymerization solvent to obtain a dope containing a polycarbodiimide having an NCO content of 3% or less and then discharging the dope and a coagulating solution containing, as the main component, a poor solvent for the polycarbodiimide, through nozzle(s) into or onto a coagulating bath containing, as the main component, a poor solvent for the polycarbodiimide while allowing the dope and the coagulating solution to contact with each other, to pulp the polycarbodiimide.

7. A process according to claim 5 or 6, wherein the organic diisocyanate is a compound represented by the following formula

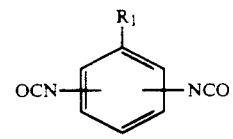

wherein $R_1$ represents a lower alkyl group or a lower alkoxy group, or the following formula

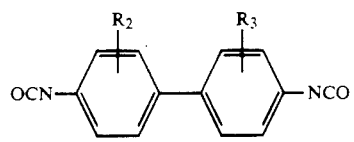

wherein $R_2$ and $R_3$ each represent a lower alkyl group or a lower alkoxy group, or the following formula

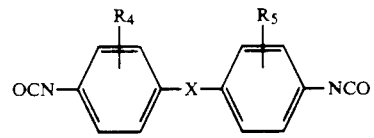

wherein $R_4$ and $R_5$ each represent a hydrogen atom, a lower alkyl group or a lower alkoxy group, and X represents an oxygen atom or a methylene group, or a mixture of the compounds represented by the above formulas.

8. A process according to claim 7, wherein the organic diisocyanate is blocked at the terminals.

9. A process according to claim 5 or 6, wherein the alicyclic ether is tetrahydrofuran, dioxane, tetrahydropyran or a mixture thereof.

10. A process according to claim 5 or 6, wherein the poor solvent for the polycarbodiimide in the coagulating solvent and/or the coagulating bath is water.

11. A process according to claim 5 or 6, wherein the poor solvent for the polycarbodiimide in the coagulating bath is heated.

12. A process according to claim 5 or 6, wherein the dope and the coagulating solution are discharged through a double-fluid nozzle.

13. A process according to claim 5 or 6, wherein the dope and the coagulating solution are discharged through respective single-fluid nozzles.

14. A process according to claim 5 or 6, wherein the dope and/or the coagulating solution is heated.

15. A polycarbodiimide pulp produced by the process according to claim 5 or 6.

* * * * *